(12) United States Patent
Chen et al.

(10) Patent No.: US 12,455,913 B2
(45) Date of Patent: Oct. 28, 2025

(54) METHOD, DEVICE, AND MEDIUM FOR CONSISTENCY DETECTION OF A DOCUMENT AND AN ABSTRACT

(71) Applicant: Beijing Youzhuju Network Technology Co., Ltd., Beijing (CN)

(72) Inventors: Jiaze Chen, Beijing (CN); Zhiyuan Zeng, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/558,157

(22) PCT Filed: Aug. 16, 2022

(86) PCT No.: PCT/CN2022/112869
§ 371 (c)(1),
(2) Date: Oct. 30, 2023

(87) PCT Pub. No.: WO2023/035883
PCT Pub. Date: Mar. 16, 2023

(65) Prior Publication Data
US 2024/0232245 A1 Jul. 11, 2024

(30) Foreign Application Priority Data
Sep. 13, 2021 (CN) .......................... 202111070769.7

(51) Int. Cl.
*G06F 16/00* (2019.01)
*G06F 16/34* (2019.01)
(Continued)

(52) U.S. Cl.
CPC .......... *G06F 16/353* (2019.01); *G06F 16/345* (2019.01); *G06F 16/383* (2019.01)

(58) Field of Classification Search
CPC ..... G06F 16/353; G06F 16/383; G06F 16/345
(Continued)

(56) References Cited

U.S. PATENT DOCUMENTS 12,093,297 B2 * 9/2024 Wu ........................ G06F 16/345
2019/0130221 A1 5/2019 Bose et al.

FOREIGN PATENT DOCUMENTS

| CN | 108595629 A | 9/2018 |
| CN | 109918496 A | 6/2019 |

(Continued)

OTHER PUBLICATIONS

ISA China National Intellectual Property Administration, Written Opinion Issued in Application No. PCT/CN2022/112869, Oct. 25, 2022, WIPO, 11 pages.

(Continued)

*Primary Examiner* — Chelcie L Daye
(74) *Attorney, Agent, or Firm* — Alleman Hall & Tuttle LLP

(57) ABSTRACT

A method of consistency detection of a document and an abstract is proposed. The method includes determining a first sample and first annotation information, the first annotation information indicating that a first abstract and a first document included in the first sample are inconsistent, at least one of a plurality of text elements in the first abstract being labeled as inconsistent with the first document; generating a first adversarial sample by applying interference information to the first sample, the interference information being applied to the first sample and other text elements in the first abstract except for the at least one text element; and training, at least based on the first sample, the first adversarial sample, and the first annotation information, a consistency detection model according to a training objective. The obtained trained model can better detect and track a part of the abstract that are inconsistent with the document.

20 Claims, 5 Drawing Sheets

(51) Int. Cl.
*G06F 16/353* (2025.01)
*G06F 16/383* (2019.01)

(58) Field of Classification Search
USPC .......................................................... 707/737
See application file for complete search history.

(56) References Cited

FOREIGN PATENT DOCUMENTS

| | | |
|---|---|---|
| CN | 110325982 A | 10/2019 |
| CN | 110334188 A | 10/2019 |
| CN | 110347819 A | 10/2019 |
| CN | 110991181 A | 4/2020 |
| CN | 111078892 A | 4/2020 |
| CN | 111783451 A | 10/2020 |
| CN | 113204958 A | 8/2021 |
| CN | 113779199 A | 12/2021 |

OTHER PUBLICATIONS

China National Intellectual Property Administration, Office Action and Search Report Issued in Application No. 202111070769.7, Aug. 23, 2022, 13 pages. Submitted with partial English translation.
ISA China National Intellectual Property Administration, International Search Report Issued in Application No. PCT/CN2022/112869, Oct. 25, 2022, WIPO, 5 pages.

* cited by examiner

METHOD, DEVICE, AND MEDIUM FOR CONSISTENCY DETECTION OF A DOCUMENT AND AN ABSTRACT

CROSS-REFERENCE TO RELATED APPLICATIONS

This application is a national stage of the International application PCT/CN2022/112869, filed on Aug. 16, 2022. This International application claims priority to Chinese Patent Application No. 202111070769.7, filed on Sep. 13, 2021. All of these applications are hereby incorporated by reference in their entireties.

TECHNICAL FIELD

Various embodiments of the present disclosure relate to the field of computers, and in particular to a method, a device, and a computer-readable storage medium for consistency detection of a document and an abstract.

BACKGROUND

Text abstract extraction is a simplified version of source document generation while retaining important information in the source document. Document abstract extraction is a branch of text generation technology that is not constrained by the text appearing in the source document. Therefore, the abstract has great flexibility and strong generation capability during generation. Currently, many researchers have developed various abstract generation model to realize automatic abstract generation.

However, a challenge faced by abstract generation lies in the trade-off between the conciseness of the abstract and the consistency of facts in the source document. The more concise the abstract, the higher the probability of factual errors appearing in the abstract. An abstract with factual errors is inadvisable. Therefore, it is expected to detect the consistency between an abstract and a document accurately and effectively, and then verify the reliability and availability of the abstract generation model.

SUMMARY

According to example embodiments of the present disclosure, a solution for consistency detection of a document and an abstract is provided.

In a first aspect of the present disclosure, a method for consistency detection of a document and an abstract is provided. The method comprises determining a first sample and first annotation information, the first annotation information indicating that a first abstract and a first document included in the first sample are inconsistent, at least one of a plurality of text elements in the first abstract being labeled as inconsistent with the first document. The method further comprises generating a first adversarial sample by applying interference information to the first sample, the interference information being applied to the first sample and other text elements in the first abstract except for the at least one text element. The method further comprises training, at least based on the first sample, the first adversarial sample, and the first annotation information, a consistency detection model according to a training objective, the consistency detection model being configured to detect whether an abstract is consistent with a document, the training objective being configured to cause both a difference between the first annotation information and a detection result of the first sample from the consistency detection model, and a difference between the first annotation information and a detection result of the first adversarial sample from the consistency detection model to be within a predetermined threshold.

In a second aspect of the present disclosure, an electronic device is provided. The device comprises at least one processing unit; and at least one memory coupled to the at least one processing unit and storing instructions executable by the at least one processing unit, the instructions, when executed by the at least one processing unit, causing the device to perform actions comprising: determining a first sample and first annotation information, the first annotation information indicating that a first abstract and a first document included in the first sample are inconsistent, at least one of a plurality of text elements in the first abstract being labeled as inconsistent with the first document; generating a first adversarial sample by applying interference information to the first sample, the interference information being applied to the first sample and other text elements in the first abstract except for the at least one text element; and training, at least based on the first sample, the first adversarial sample, and the first annotation information, a consistency detection model according to a training objective, the consistency detection model being configured to detect whether an abstract is consistent with a document, the training objective being configured to cause both a difference between the first annotation information and a detection result of the first sample from the consistency detection model, and a difference between the first annotation information and a detection result of the first adversarial sample from the consistency detection model to be within a predetermined threshold.

In a third aspect of the present disclosure, an apparatus for consistency detection of a document and an abstract is provided. The apparatus comprises a determining unit configured to determine a first sample and first annotation information. The first annotation information indicates that a first abstract and a first document included in the first sample are inconsistent. At least one of a plurality of text elements in the first abstract is labeled as inconsistent with the first document. The apparatus comprises an adversarial generating unit configured to generate a first adversarial sample by applying interference information to the first sample. The interference information is applied to the first sample and other text elements in the first abstract except for the at least one text element. The apparatus comprises a training unit configured to train, at least based on the first sample, the first adversarial sample, and the first annotation information, a consistency detection model according to a training objective. The consistency detection model is configured to detect whether an abstract is consistent with a document. The training objective is configured to cause both a difference between the first annotation information and a detection result of the first sample from the consistency detection model, and a difference between the first annotation information and a detection result of the first adversarial sample from the consistency detection model to be within a predetermined threshold.

In a fourth aspect of the present disclosure, a computer-readable storage medium is provided. The medium has a computer program stored thereon which, when executed by a processor, performs the method of the first aspect.

It would be appreciated that the content described in the Summary section of the present invention is neither intended to identify key or essential features of the embodiments of the present disclosure, nor is it intended to limit the scope of the present disclosure. Other features of the present disclosure will be readily envisaged through the following description.

BRIEF DESCRIPTION OF THE DRAWINGS

The above and other features, advantages and aspects of the embodiments of the present disclosure will become more apparent in combination with the accompanying drawings and with reference to the following detailed description. In the drawings, the same or similar reference symbols refer to the same or similar elements, where.

DETAILED DESCRIPTION

Figure 1:
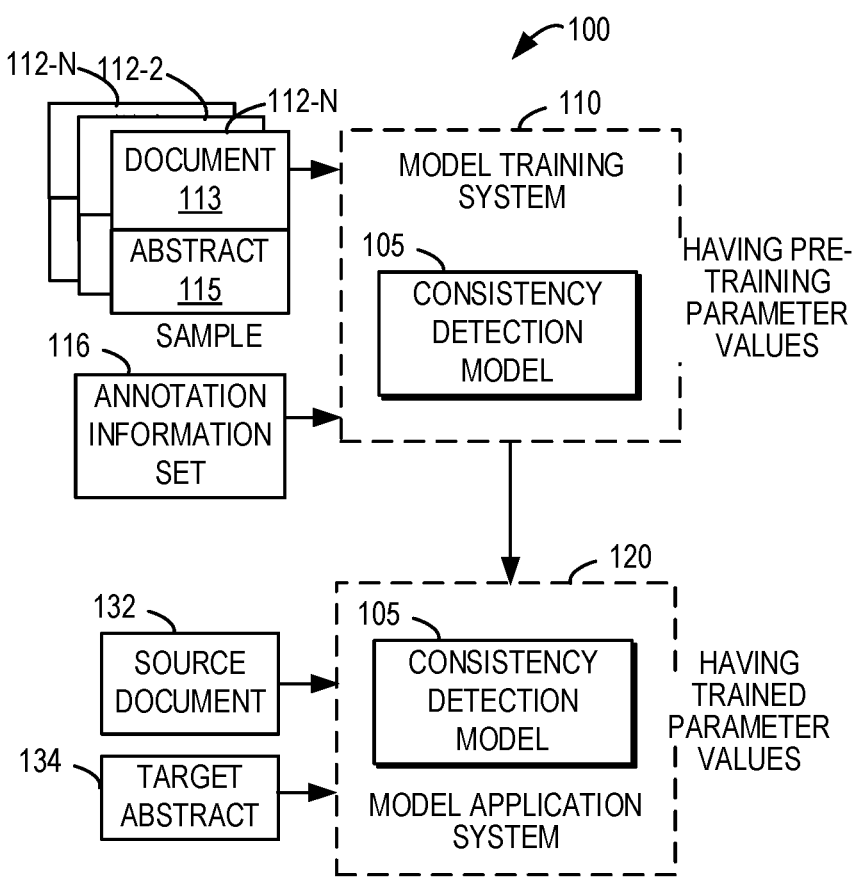
FIG. 1 illustrates a schematic diagram of an example environment in which embodiments of the present disclosure can be implemented.

The embodiments of the present disclosure will be described in more detail below with reference to the accompanying drawings. Although some embodiments of the present disclosure are shown in the drawings, it would be appreciated that the present disclosure can be implemented in various forms and should not be interpreted as limited to the embodiments described herein. On the contrary, these embodiments are provided for a more thorough and complete understanding of the present disclosure. It would be appreciated that the drawings and embodiments of the present disclosure are only for illustrative purposes and are not intended to limit the scope of protection of the present disclosure.

In the description of the embodiments of the present disclosure, the term "including" and similar terms should be understood as open inclusion, that is, "including but not limited to". The term "based on" should be understood as "at least partially based on". The term "one embodiment" or "the embodiment" should be understood as "at least one embodiment". The term "some embodiments" should be understood as "at least some embodiments". Other explicit and implicit definitions may also be included below.

As used herein, the term "model" may learn the correlation between corresponding inputs and outputs from training data, so that after training is completed, corresponding outputs may be generated for a given input. The model may be generated based on machine learning technology. Deep learning is a kind of machine learning algorithm that uses multiple layers of processing units to process inputs and provide corresponding outputs. The neural network model is an example deep learning based model. The "model" herein may also be referred to as "a machine learning model", "a learning model", "a machine learning network", or "a learning network", and these terms herein may be used interchangeably.

A "neural network" is a machine learning network based on deep learning. The neural network may process inputs and provide corresponding outputs, and the neural network typically includes an input layer, an output layer, and one or more hidden layers between the input and output layers. A neural network used in deep learning applications typically includes many hidden layers to increase the depth of the network. Each layers of a neural network are sequentially connected, so that outputs of a previous layer may be provided as inputs to a subsequent layer. The input layer receives inputs of the neural network, while outputs of the output layer serve as final outputs of the neural network. Each layer of the neural network includes one or more nodes (also referred to as processing nodes or neurons), and each node processes inputs from the previous layer.

Generally, machine learning may generally include three stages, namely a training stage, a testing stage, and an application stage (also referred to as an inference stage). During the training stage, a given model may be trained using a large amount of training data, iteratively updating values of parameters until the model may obtain consistent reasoning that meets the expected goals from the training data. Through training, the model may be considered to be able to learn the correlation between inputs and outputs (also referred to be as inputs to outputs mapping) from the training data. The parameters values for the trained model are determined. In the testing stage, testing inputs are applied to the trained model to test whether the model can provide correct outputs, thereby determining the performance of the model. In the application stage, the model may be used to process actual inputs and determine the corresponding outputs based on the parameter values obtained through training.

As mentioned above, it is expected to detect whether an abstract is consistent with a document. There are currently some schemes for detecting or improving the consistency between an abstract and a document. Some schemes focus on using information extraction tools to extract facts from the document and the abstract separately, and comparing the extracted facts to determine whether the document and the abstract are consistent. However, such a solution relies on the accuracy of information extraction tools. Some schemes propose using natural language reasoning or question answering models for fact checking, through designing document-related questions and verifying whether the correct answers can be found from the abstract, to detect the consistency of the abstract. However, the accuracy of the question answering mechanism depends on the identification of key sentences, the different text lengths of the document and the abstract make it difficult to ensure the reliability of question answering.

In addition, it is proposed to train the consistency detection model to learn consistency-related characteristics between the document and the abstract. This solution is more reliable and stable. However, the models trained by the current training schemes still require many improvements.

Sample Environment

FIG. 1 illustrates a block diagram of an environment 100 capable of implementing multiple implementations of the present disclosure. In the environment 100 of FIG. 1, it is expected to train and use a model such as a consistency detection model 105, which is configured to detect whether an abstract is consistent with a document.

In the present disclosure, consistency between the abstract and the document refers to the absence of errors or deviations from the facts expressed by the document in the abstract, meaning that the abstract does not contain factual errors. Usually, people may have a comprehensive understanding of the facts presented in a document when reading it, and due to simplification, an abstract may contain factual errors. Specifically, in some applications, there may be an abstract of a document generated automatically through a model. The consistency detection between such an abstract and such a document requires more attention. The consistency of an abstract and a document may also be used to measure the reliability and availability of an abstract generation model.

As shown in FIG. 1, the environment 100 includes a model training system 110 and a model application system 120. In an example embodiment of FIG. 1 and some example embodiments to be described below, the model training system 110 is configured to train the consistency detection model 105 using multiple training samples 112-1, 112-2, . . . , 112-N and an annotation information set 114, where N is an integer greater than or equal to 1. For the purpose of discussion, these samples are usually referred to as samples 112. Each sample 112 includes a document 113 and an abstract 115. The annotation information set 114 includes annotation information for the samples 112, which indicates whether an abstract is consistent with a document in a sample 112. The samples 112 used for training the model may include one or more positive samples and one or more negative samples. The abstract in the positive sample is consistent with the document, while the abstract in the negative sample is inconsistent with the document. The consistency detection model 105 may learn from positive samples which characteristics of abstracts and documents are consistent with each other, and from negative samples which characteristics of abstracts and documents are inconsistent with each other.

In the present disclosure, "document" refers to an object that partially or completely presents text in a natural language form. A document may have any electronic format, as long as textual information can be extracted from it. In a subsequent processing, the text in the document is used as a processing object. Each document may include multiple text elements.

In the present disclosure, "abstract" refers to a simplified version of a document that expresses important information in the document in a simpler and less textual manner. Each abstract may include multiple text elements.

In the present disclosure, "text element" refers to a unit processed in a natural language processing task, and its granularity may be changed and configured according to the applications. For example, a text element may include a word, a phrase, a symbol, or a combination thereof, or any other unit that may appear in a natural language expression. In some examples, a text element may also be referred to as a token.

Before training, parameter values of the consistency detection model 105 may be initialized or pre-trained parameter values obtained through a pre-training process. After the training process, the parameter values of the consistency detection model 105 are updated and adjusted. After the training is completed, the consistency detection model 105 has trained parameter values. Based on such parameter values, the consistency detection model 105 may be used to perform consistency detection tasks between abstracts and documents.

In FIG. 1, the model application system 120 receives an input source document 132 and a target abstract 134. The model application system 120 may be configured to perform consistency detection for the source document 132 and the target abstract 134 using the trained consistency detection model 105.

In FIG. 1, the model training system 110 and the model application system 120 may be any systems with computing capability, for example various computing devices/systems, terminal devices, servers, etc. The terminal devices may be any type of mobile terminals, fixed terminals or portable terminals, including a mobile phone, a desktop computer, a laptop computer, a notebook computer, a netbook computer, a tablet computer, a media computer, a multimedia tablet, or any combination thereof, including accessories and peripherals of these devices or any combination thereof. Servers include but are not limited to mainframes, edge computing nodes, computing devices in a cloud environment, etc.

It would be appreciated that components and arrangements in the environment shown in FIG. 1 are only examples, and a computing system suitable for implementing the example embodiments described in the present disclosure may include one or more different components, other components, and/or different arrangements. For example, although shown as separate, the model training system 110 and the model application system 120 may be integrated into a same system or device. The embodiments of the present disclosure are not limited in this regard.

The following will continue to refer to the accompanying drawings to describe example embodiments of model training and model application respectively.

Model Training Architecture

According to the embodiments of the present disclosure, an improved consistency detection scheme for a document and an abstract is proposed. According to this scheme, when training the consistency detection model, adversarial negative samples are constructed using adversarial data augmentation training method for the negative samples used for training, i.e. samples with mismatched abstracts and documents. The adversarial negative samples are usually generated by applying perturbation information to the negative samples. In the embodiments of the present disclosure, a more effective adversarial data augmentation method is proposed to construct the adversarial negative samples. However, using the negative samples and the adversarial negative samples to train the consistency detection model enables the model to better detect and track a part of the abstract that are inconsistent with the document.

Figure 2:
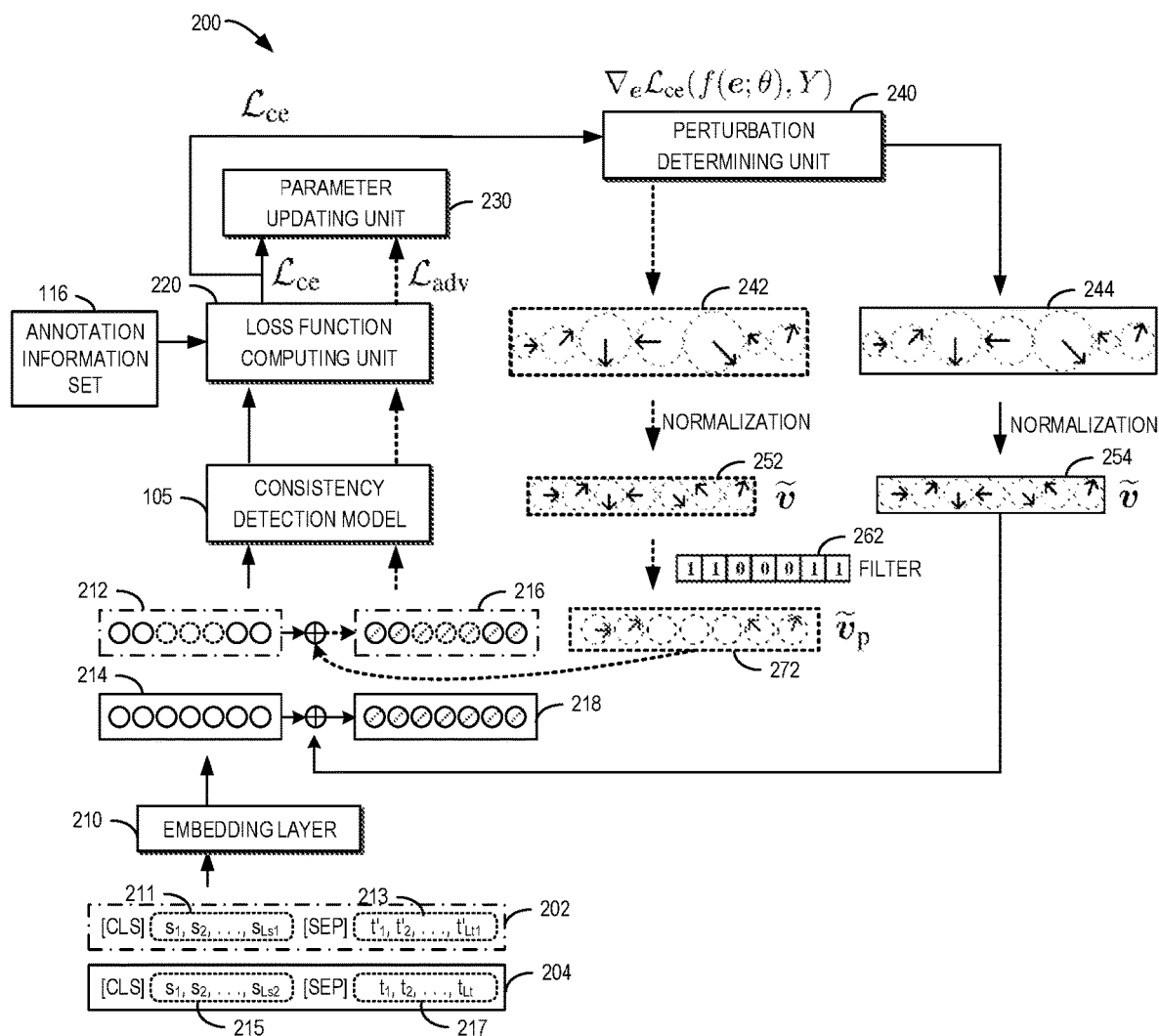
FIG. 2 illustrates an architecture for training a consistency detection model according to some embodiments of the present disclosure.

FIG. 2 illustrates an example architecture 200 for training the consistency detection model 105 according to some embodiments of the present disclosure. The architecture 200 of FIG. 2 may be implemented in the model training system 110 of FIG. 1. Each unit/component in the architecture 200 may be implemented by hardware, software, firmware, or any combination thereof.

As shown in FIG. 2, samples 202 and 204 for training the consistency detection model 105 are shown. The samples 202 and 204 are to be used to train the consistency detection model 105, which may include the samples 112 in FIG. 1, for example. The samples 202 and 204 may be represented in a text sequence form. The text sequence consists of multiple text elements of a document and multiple text elements of an abstract cascaded together. In addition, to differentiate, in some embodiments, the text sequences of samples 202 and 204 further include a symbol [CLS] located at a starting position to indicate the start of the text sequence, and a symbol [SEP] inserted between the document and the abstract to separate the document and abstract.

In FIG. 2, the shown sample 202 includes a document 211 and an abstract 213, where the abstract 213 is inconsistent with the document 211, meaning that the sample 202 is a negative sample used for training the consistency detection model 105, also referred to as an inconsistent sample. The shown sample 204 includes a document 215 and an abstract 217, where the abstract 217 is inconsistent with the document 215, meaning that the sample 204 is a positive sample used for training the consistency detection model 105, also referred to as a consistent sample. The consistency between the document and the abstract of each sample is indicated by an annotation information set 116.

For the purpose of discussion, the document 211 in the sample 202 (represented as $x_p$) may be represented as $s=\{s_1, s_2, \ldots s_{Ls1}\}$, where $s_n$ represents the $n^{th}$ text element (or token) in the document 211, n=1, 2, . . . Ls1, and Ls1 represents the number of text elements in the document 211. The abstract 213 in the sample 202 may be represented as $t'=\{t'_1, t'_2, \ldots t'_{Lt1}\}$, where $t'_n$ represents the $n^{th}$ text element (or token) in the abstract 213, n=1, 2, . . . Lt1, and Lt1 represents the number of text elements in the abstract 213.

The document 215 in the sample 204 (represented as $x_n$) may be represented as $s=\{s_1, s_2, \ldots s_{Ls2}\}$, where $s_n$ represents the $n^{th}$ text element (or token) in the document 215, n=1, 2, . . . Ls2, and Ls2 represents the number of text elements in the document 215. The abstract 217 in the sample 204 may be represented as $t=\{t_1, t_2, \ldots t_{Lt2}\}$, where ln represents the $n^{th}$ text element (or token) in the abstract 217, n=1, 2, . . . Lt2, and Lt2 represents the number of text elements in the abstract 217. The text elements of documents and abstracts in different samples may be the same or different. In some embodiments, for the convenience of subsequent processing, through a manner of filling, the number of text elements included in text sequences obtained by cascading documents and abstracts in different samples may be caused to be equal to a predetermined number.

Note that although only two samples 202 and 204 are shown in FIG. 2, more samples may be required when training the consistency detection model 105. These samples are no longer shown individually.

As shown in FIG. 2, the text sequence of each sample may be provided to an embedding layer 210 to output a corresponding embedding representation for each sample by the embedding layer 210. In the present disclosure, "embedding representation" refers to a vectorization representation of a text sequence, where each text element and other special symbols (for example, [CLS] and [SEP]) in the text sequences may be converted to a corresponding vector. An overall vectorization representation of the text sequences may be in a multidimensional vector form. In this way, the subsequent processing may be carried out on the basis of the vectorization representation. In the generation of embedding representations, different text elements or symbols may be converted to different vectors.

It is assumed that the text sequence of a sample is represented as $x=\{x_1, x_2, \ldots x_{Lx}\}$, where $x_i$ represents the $i^{th}$ text element, i=1, 2, . . . Lx, and Lx represents a total number of text elements and special symbols in documents and abstracts in the sample. The embedding representation generated by the embedding layer 210 is e, which includes $e_i=E(x_i)$, where $e_i$ indicates a vector transformed by the $i^{th}$ text element or symbol in the text sequence. In FIG. 2, the embedding layer 210 determines an embedding representation 212 for the sample 202 and an embedding representation 214 for the sample 204.

In some embodiments, the embedding layer 210 may use predetermined text elements and symbols, and a vector mapping table to perform a determination of embedding representations, or use a machine learning model, for example a language model, to extract features of text sequences as embedding representations. The embodiments of the present disclosure are not limited in this regard.

In some embodiments, the positive sample and the negative sample (for example, the sample 204 and the sample 202) for training the consistency detection model 105 may be obtained from a database or from other data sources. In practical applications, there may be a large number of positive samples in existing data sources, namely documents and abstracts that are consistent with each other. In order to expand the samples used for training the consistency detection model 105, in some embodiments, the negative samples may also be constructed based on the existing positive samples to obtain artificial training data. This may avoid huge cost caused by manually generating or labeling negative samples, and may achieve fast, effective, and low-cost acquisition of the negative samples and their supervisory information for model training on the basis of only having supervisory information of the positive samples.

In the embodiments of generating artificial training data, it is assumed that the sample 202 with the inconsistent document 211 and the abstract 213 in FIG. 2 is generated from the positive samples (for example, the sample 204). It is assumed that the positive sample 204 is represented as $x_n=\{s, t\}$, where s represents the document 215 and/represents the abstract 217. When generating the sample 202, one or more text elements in the abstract 217 may be modified to disturb the consistency between the abstract 217 and the document 215, in order to obtain the inconsistent sample 202. In such an embodiment, the sample 204 may be represented as $x_p=\{s, t'\}$, and the document 211 is the same as the document 215 in the sample 205, i.e. s, the abstract 213 (i.e., t') is a modified version of the abstract 217 (i.e., t). In the embodiment of generating artificial training data, the annotation information set 116 not only records the annotation information of the existing sample 204, but also supplements newly generated annotation information of the sample 202, which indicates that the document 211 is inconsistent with the abstract 213.

There are multiple ways to disturb the consistency between the abstract 217 and the document 215. Some example methods will be described below.

In some embodiments, one or more text elements in the abstract 217 may be modified in an entity replacement manner. Specifically, an entity in the abstract 217 may be replaced with an entity of a same type in the document 215 to obtain the abstract 213. In some examples, one or more entities in the abstract 217 may be replaced. In text, an 'entity' refers to a thing or a concept. Each entity may be represented by one or more text elements (for example, words, phrases), etc. Entities may be divided into types as people, roles, objects, events, etc. When modifying the abstract 217, the entity (for example, a name of a person) that exists in the abstract 217 may be replaced by a further entity of the same type (for example, a name of another person) that appears in the document 215. In some embodiments, a further entity of the same type may be randomly selected from the document 215. In some embodiments, in order to reduce errors caused by synonyms, near-synonyms, etc., the similarity between the entity to be replaced in the abstract 217 and multiple entities of the same type randomly selected from the document 215 may be computed, and an entity with a similarity greater than a threshold similarity in the document 215 may be used to replace the entity in the abstract 217. The similarity between entities, for example, may be measured using text-based distance algorithms. The threshold similarity may be configured as needed.

Alternatively, or in addition, in some embodiments, one or more text elements in the abstract 217 may be modified in a pronoun substitution manner. Specifically, a pronoun in the abstract 217 may be replaced with a further pronoun to obtain the abstract 213. Each pronoun may be represented by one or more text elements (for example, words, phrases), etc. The further pronoun may be a pronoun that matches the grammar of the sentence in which a pronoun in the abstract 217 is located, to avoid grammar errors in the modified abstract. For example, pronouns "he" and "his" may be replaced with pronouns "she" and "her" respectively, and pronouns "they", "we", "you", etc. may be replaced with each other, etc. In some embodiments, one or more pronouns in the abstract 217 may be replaced. In some embodiments, the pronouns to be replaced in the abstract 217 may be randomly selected.

Alternatively, or in addition, in some embodiments, one or more text elements in the abstract 217 may be modified through affirmative-negative modification. Specifically, a verb in an affirmative form in the abstract 217 may be modified to a verb in a negative form, and/or a verb in the negative form may be modified to a pronoun in the affirmative form, to obtain the abstract 213. Each verb may be represented by one or more text elements (for example, words, phrases), etc. Through changing the verb between the affirmative form and the negative form, the facts described in the abstract 217 may be changed, thereby resulting in the modified abstract inconsistent with the original document 215. In some embodiments, in Latin languages such as English, the positive and negative forms of auxiliary verbs, such as the verb be, modal verbs (for example, should, could, would, etc.), may also be modified specifically. In some embodiments, one or more verbs in the abstract 217 may be replaced. In some embodiments, the verb to be replaced in the abstract 217 may be randomly selected.

Figure 3:
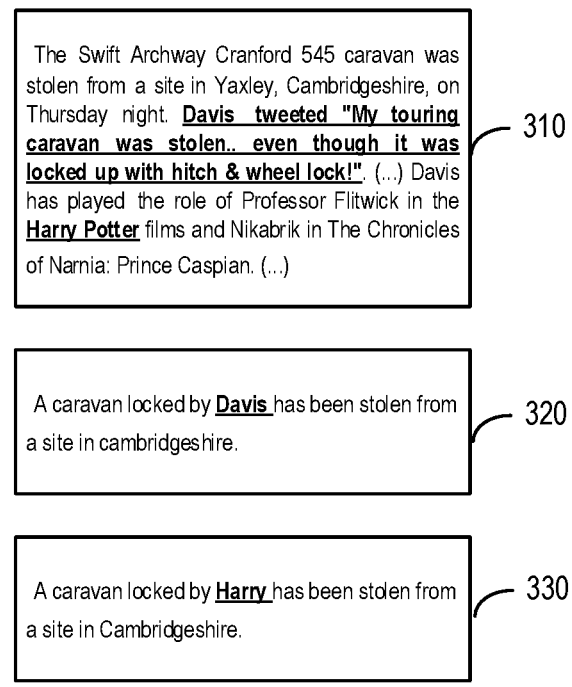
FIG. 3 illustrates an example of a source document and an abstract according to some embodiments of the present disclosure.

FIG. 3 illustrates an example of a source document and an abstract according to some embodiments of the present disclosure. In this example, a document 310 and an abstract 320 in which the fact is consistent with that of the document 310 are provided. The abstract 320 provides a correct overview of key information in the document 310, for example a bold and underlined sentence in the document 310. Therefore, the document 310 and the abstract 320 may form a consistent positive sample. In order to disrupt the consistency between the document 310 and the abstract 320, a name entity "Davis" in the abstract 320 is replaced with a further name entity "Harry" appearing in the document 320 through entity replacement, thereby obtaining a modified abstract 330. The facts described in the abstract 330 are no longer consistent with the document 310, so the document 310 and the abstract 330 may form an inconsistent negative sample.

Some example manners to modify an abstract in a positive sample to construct an abstract in a negative sample are described above. In other embodiments, other manners may further be applied to modify the abstract 217 to construct an abstract that is inconsistent with the original document. In some embodiments, for the same abstract 217, one or more text elements in the abstract 217 may be modified in one or more manners.

In the abstract 213, the modified text elements obtained by modifying the text elements in the abstract 217 are the cause of inconsistency between the abstract 213 and the original document, therefore that or those text elements may be labeled as inconsistent with the original document. Such labels will be used in subsequent model training.

In some embodiments, in addition to constructing negative samples from existing positive samples, or as an alternative, one or more negative samples may further be obtained from existing databases or through artificial means for training the consistency detection model 105. In some embodiments, for certain positive samples, corresponding negative samples may not be constructed. The embodiments of the present disclosure are not limited in this regard.

In some embodiments, in addition to training the consistency detection model 105 based on positive and negative samples, adversarial enhancement may also be utilized to improve the robustness of the consistency detection model 105. Generally, the model trained on general positive and negative samples, especially on artificially constructed samples, may provide correct results for simple inputs, but its robustness to complex situations that may arise in practical applications is not high. Therefore, adversarial enhancement may improve the robustness of the trained model to complex samples.

Generally speaking, the adversarial enhancement manner is to apply interference information to existing samples (positive and negative samples) to obtain adversarial samples. Due to the addition of the interference information, the adversarial samples are different from existing simple samples. During model training, the model is required to learn from the adversarial sample to output the same detection result as that of the existing sample for adversarial sample. For example, for the adversarial positive sample constructed from the existing positive sample, the model is required to be able to determine whether the abstract and the document in the adversarial positive sample are consistent, while for the adversarial negative sample constructed from the existing negative sample, the model is required to be able to determine whether the abstract and the document in the adversarial negative sample are inconsistent. The model trained in this way may also provide correct detection result when facing a complex input that vary in practical applications.

Adversarial enhancement is often used in machine learning applications. However, in conventional schemes, for both positive and negative samples, perturbation information is completely applied to the samples in the same way. The inventor of the present disclosure has found that in tasks involving consistency detection between a document and an abstract, such manner of applying perturbation is detrimental in improving the accuracy of detection and tracking errors in the abstract. Therefore, according to the embodiments of the present disclosure, an improved adversarial enhancement method is proposed. The following will first discuss how to determine the perturbation information for generating adversarial samples, and then discuss the improved adversarial enhancement method.

In some embodiments, the perturbation information may be determined for both positive and negative samples. Still referring to FIG. 2, the samples 202 and 204 are taken as examples for explanation. The samples 202 and 204 may be applied to the consistency detection model 105, respectively. Specifically, the embedding representation 212 corresponding to the sample 202 and the embedding representation 214 corresponding to the sample 204 may be input into the consistency detection model 105. The consistency detection model 105 utilizes the current parameter values to process the embedding representations 212 and 214 to provide corresponding detection results. The detection result for the sample 202 indicate whether the abstract 213 and the document 211 in the sample 202 are consistent, and the detection result for the sample 204 indicate whether the abstract 215 and the document 217 in the sample 204 are consistent. The current detection result reflects initial detection capability or detection capability learned intermediately of the consistency detection model 105. Note that the training process of the model is an iterative process, during which the detection capability of the model will continuously improve.

In some embodiments, the consistency detection model 105 may include a feature extraction section and a result prediction section. The feature extraction section is used to extract feature representations related to the document and the abstract from the embedding representations. The feature extraction section may be considered as an encoding process of the text sequence, and the feature representations may be represented as $r_i = f(E(x_i))$, where $f(\cdot)$ represents the feature extraction process, and $r_i$ represents the feature representations extracted for the $i^{th}$ text element or special symbol $x_i$ in the input text sequence. In some embodiments, the feature extraction section may be implemented using various machine learning models, neural networks, etc. (for example, Roberta models, various encoder models, etc) suitable for feature extraction of text.

The result prediction section is used to determine prediction results based on the features extracted by the feature extraction section, that is, whether the input abstract is consistent with the document. In some embodiments, the result prediction section may be implemented as a linear layer, such as a softmax layer, etc. The output of the consistency detection model 105 is a binary input, which includes both consistent and inconsistent prediction results.

The detection result generated by the consistency detection model 105 for each sample is provided to a loss function computing unit 220. The loss function computing unit 220 is configured to determine, based on the annotation information set 116, the difference between the detection result generated by the consistency detection model 105 for each sample and the annotation information for that sample in the annotation information set 116. In some embodiments, such a difference may be expressed in a form of a loss function, such as cross entropy loss, which may be expressed as $L_{ce}(f(e; \theta, Y))$, where e represents a sample (specifically the embedding representation of the sample), $\theta$ represents the current parameter values of the consistency detection model 105, Y represents the annotation information of the sample, Y ∈ {consistent, inconsistent}. The loss function $L_{ce}(f(e; \theta, Y))$ is used to measure the difference between the prediction result given by the consistency detection model 105, based on the current parameter values, for the sample e and the real result given by the annotation information Y.

During the model training process, the training objective is configured to reduce or minimize the difference between the detection result of the consistency detection model 105 on the samples and the annotated information, for example, reduce to a predetermined threshold (set as needed). Such a training objective may be achieved by updating the parameter values of the consistency detection model 105 to reduce or minimize the loss function $L_{ce}$. Specifically, the architecture 200 includes a parameter updating unit 230, which is configured to update the parameter values of the consistency detection model 105 based on the training objective. Therefore, the loss function $L_{ce}$ may be provided to the parameter updating unit 230 for updating the parameter values of the model.

At the initial stage of the training, because the parameter values are not ideal, the consistency detection model 105 may not be able to accurately predict the consistency of the document and the abstract in an input sample. As the parameter values are constantly updated, the detection capability of the model is improved, thereby the value of the loss function is constantly reduced.

When performing the model training based on the loss function, various training methods, for example a stochastic gradient descent method, may be used to update model parameters, thereby determining how to update model parameter values.

In some embodiments, when determining the adversarial sample of a certain sample, the total interference information to be applied to the sample may be determined based on the difference between the detection result of the original sample and the annotation information, that is, based on the loss function $L_{ce}(f(e; \theta, Y))$. The adversarial sample is generated based on the total interference information and the original samples.

In FIG. 2, the total interference information of each sample may be determined by a perturbation determining unit 240. The total interference information may be represented as a perturbation vector, which includes a vector applied to each text element or special symbol of the text sequence of the sample (such as the samples 202 or 204). In some embodiments, the total interference information may be determined as a worst interference vector that can maximize the loss function $L_{ce}(f(e; \theta, Y))$, that is, it is expected that the total interference information can interfere with or hinder the consistency detection model 105 from correctly detecting the adversarial sample, so as to enhance the detection capability of the consistency detection model to detect the adversarial sample.

In some examples, the determination of the total interference information for the sample may be represented as follows:

$$\tilde{v} = \underset{\|v\| \le \epsilon}{\arg\max} L_{ce}(f(e+v; \theta), Y) \qquad \text{Equation (1)}$$

where $\tilde{v}$ represents the total interference information determined for the sample e, $\epsilon$ represents a norm bound of the total interference information, which may be a predetermined value, e+v represents the adversarial sample obtained after applying the interference information v to the sample e, and argmax( ) represents the interference information v obtained under the condition of maximizing the loss function $L_{ce}(f(e; \theta, Y))$, which is determined as the total interference information $\tilde{v}$ determined for the sample e.

Considering the complexity of the consistency detection model 105, it may be difficult to accurately calculate the total interference information $\tilde{v}$. In some embodiments, the total interference information $\tilde{v}$ may be determined from Equation (1) through various approximate methods. In some implementations, a Fast Gradient Value (FGV) algorithm may be used to calculate the total interference information $\tilde{v}$, which may be represented as follows:

$$\tilde{v} = \epsilon \frac{g}{\|g\|};$$ Equation (2)

where $$g = \nabla_e L_{ce}(f(e; \theta), Y)$$

in Equation (2), the gradient g is first order differential of the loss function $L_{ce}$, which represents the rapid change of the loss function with respect to the sample e, that is, the direction of the rapid growth;

$$\tilde{v} = \epsilon \frac{g}{\|g\|}$$

represents normalization of the gradient g, where $\|g\|$ represents the norm of the gradient g. This normalization may ensure that the approximate value $\tilde{v}$ of the total interference information is more reasonable.

As shown in FIG. 2, the perturbation determining unit 240 determines interference information 242 for the sample 202 based on the loss function $L_{ce}(f(e; \theta, Y))$, for example, using Equation (2), and obtains total interference information 252 $\tilde{v}$ for the sample 202 through the normalization. The perturbation determining unit 240 may similarly determine the interference information 244 for the sample 204 and normalize the total interference information 254 $\tilde{v}$ for the sample 204.

The total interference information $\tilde{v}$ determined for a sample includes an interference vector applied to each text element in the sample. According to the embodiments of the present disclosure, when determining the adversarial sample for the negative sample, an interference information portion to be applied to the text element labeled as inconsistent in the abstract of the negative sample is filtered out, and the interference information is applied to other text elements in the negative sample. That is, for the negative sample, the one or more text elements labeled as inconsistent with the document in the abstract will not be applied with interference.

In the example of FIG. 2, the sample 202 is a negative sample, therefore the total interference information 252 will be filtered by the filtering vector 262 to obtain the filtered interference information 272 $\tilde{v}_p$. The filtering vector 262 may be composed of 0 and 1, where the value of 0 is applied to the interference vector corresponding to the text elements labeled as inconsistent in the abstract 213 in the total interference information 252, and the value of 1 is applied to the interference vector corresponding to the document 211 and other text elements in the abstract 213 in the total interference information 252. Therefore, the interference information 272 no longer includes the interference vector corresponding to the text elements labeled as inconsistent in the abstract 213.

In some embodiments, when constructing the negative sample 202 from the positive sample, which text element(s) in the abstract 213 is modified from the abstract 217 may be labeled, so that such annotation information may be directly utilized during filtering. In some embodiments, if the negative sample 202 is directly obtained from an existing data source, the text elements in the abstract 213 that are inconsistent with the document 211 may be manually or automatically labeled by other means.

The interference information 272 $\tilde{v}_p$ is applied to the sample 202, for example, is applied to the embedding representation e corresponding to the sample 202, resulting in the embedding representation 216 corresponding to the adversarial sample of the sample 202, which is represented as $e'=e+\tilde{v}_p$.

In some embodiments, for the positive sample, for example the sample 204, the normalized total interference information 254 $\tilde{v}$ may be directly applied to the embedding representation e corresponding to the sample 204, resulting in the embedding representation 218 corresponding to the adversarial sample of the sample 204, which is represented as $e'=e+\tilde{v}$. That is, for positive samples, each text element of the document and abstract may be interfered with.

The adversarial samples of the positive sample and the negative sample may also be applied to the consistency detection model 105 to construct a further loss function. For example, as shown in FIG. 2, the embedding representations 216 and 218 of the adversarial samples corresponding to the samples 202 and 204 may be input into the consistency detection model 105, respectively, to process the embedding representations 216 and 218 using the current parameter values by the consistency detection model 105 to provide corresponding detection results. The detection result for the embedding representation 216 indicates whether the document and the abstract in the adversarial sample corresponding to the sample 202 are consistent, that is, whether the interfered abstract 213 is consistent with the interfered document 211. The detection result for the embedding representation 218 indicates whether the document and the abstract in the adversarial sample corresponding to the sample 204 are consistent, that is, whether the interfered abstract 217 is consistent with the interfered document 215.

The annotation information of the adversarial sample is consistent with the annotation information of the original sample. In other words, it is expected that the consistency detection model 105 has higher robustness and can still provide the same detection result for the abstract and document modified by the interference information as the abstract and sample before interference.

The detection results generated by the consistency detection model 105 for each sample are provided to the loss function computing unit 220. The loss function computing unit 220 is configured to determine, based on the annotation information set 116, the difference between the detection result generated by the consistency detection model 105 for each adversarial sample and the annotation information for the original sample corresponding to the adversarial sample in the annotation information set 116. In some embodiments, such a difference may be expressed in the form of the loss function, such as the cross entropy loss, which may be expressed as an adversarial loss function $L_{adv}(f(e'; \theta, Y))$, where e' represents an adversarial sample (specifically the embedding representation of the adversarial sample), $\theta$ represents the current parameter values of the consistency detection model 105, Y represents the annotation information of the original sample e corresponding to the adversarial sample, $Y \in \{consistent, inconsistent\}$.

During the model training process, the training objective is configured to reduce or minimize the difference between the detection result of the consistency detection model 105 on the adversarial samples and the annotated information, for example, reduce to a predetermined threshold (set as needed). Such a training objective may be achieved by updating the parameter values of the consistency detection model 105 to reduce or minimize the loss function $L_{adv}$. Therefore, the loss function $L_{adv}$ may be provided to the parameter updating unit 230 for updating the parameter values of the model.

Therefore, the parameter updating unit 230 may update the parameter values of the model based on two loss functions to achieve the overall training objectives, that is to cause the difference between the detection result of the consistency detection model 105 on the original sample and the annotation information to be reduced or minimized, and the difference between the detection result of the adversarial sample and the annotation information is also reduced or minimized. The total loss function used by the parameter updating unit 230 for updating model parameter values may be expressed as:

$$L = \alpha \cdot L_{ce} + (1 - \alpha) \cdot L_{adv} \qquad \text{Equation (3)}$$

where α is a predetermined value between 0 and 1 for trade-off between the two loss functions.

When performing model training based on the loss function, the parameter updating unit 230 may use various training methods, for example a stochastic gradient descent method etc., to update the model parameters so that the total loss function L is reduced to within a predetermined threshold or minimized.

Generally, the application of the interference information and the use of the adversarial samples are aimed at improving the robustness of the model to inputs, however this may also reduce the sensitivity of the model to inputs. According to the embodiments of the present disclosure, the consistency detection model remains sensitive to finding inconsistent text elements in the abstract through masking the interference information of the inconsistent text elements in the abstract for negative samples. This not only improves the accuracy of consistency detection in the consistency detection model, but also enables the consistency detection model to better track the error part in the abstract, thereby obtaining automatic error tracking capability.

This error tracking capability is achieved through the use of the gradient g of backward propagation. The following will analyze how to achieve such error tracking.

It is assumed $\Delta L = L_{adv} - L_{ce}$, for Equation (3). Since the loss function $L_{adv}$ is determined by the adversarial sample, and the difference between the adversarial sample and the annotation information may be higher than the difference between the original sample and the annotation information, then $\Delta L = L_{adv} - L_{ce} \geq 0$. Equation (3) may be simplified as $L = L_{ce} + (1-\alpha) \cdot \Delta L$. In the training process, for the negative sample, because the perturbation of the inconsistent text elements is masked (that is, not applied to the adversarial sample), the change of these text elements will lead to greater changes in the total loss function, that is, the consistency detection model 105 will maintain sensitivity to these text elements. Therefore, changes in these text elements will lead to greater changes in the detection result. Accordingly, when using the loss function to compute the gradient, it may be observed that the gradient g of the loss function is higher than that of the inconsistent text elements. That is because the change rate of the loss function L is greater than that of these inconsistent text elements. This phenomenon may be utilized during the model application stage to help label or remind errors in the inconsistent abstracts during the model application stage, which will be described in detail below.

Model Application Architecture

The training of the consistency detection model 105 is discussed in the above. The trained consistency detection model 105 may be provided to be used in the model application system 120 for consistency determination of the input source document 132 and the input target abstract 134.

Figure 4:
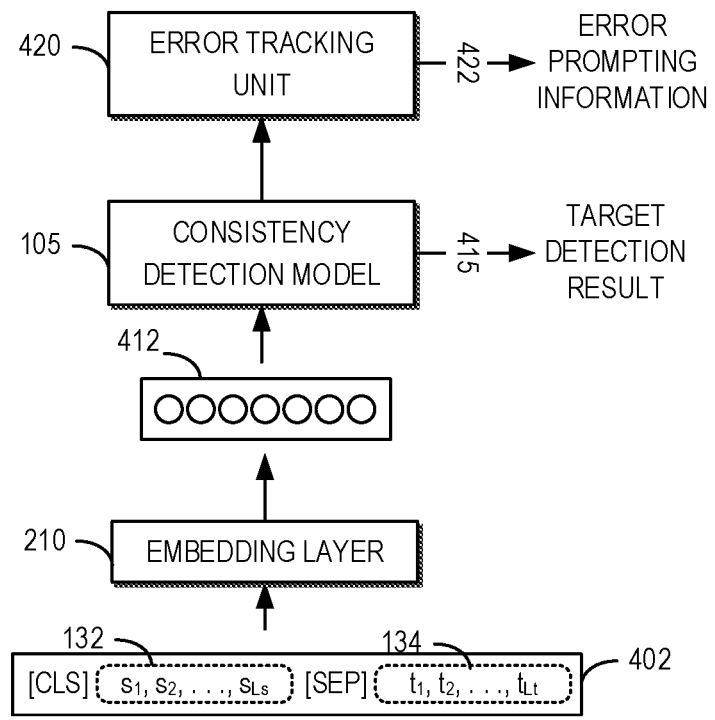
FIG. 4 illustrates an architecture for applying a consistency detection model according to some embodiments of the present disclosure.

FIG. 4 illustrates an architecture 400 for applying the consistency detection model 105 according to some embodiments of the present disclosure. The architecture 400 of FIG. 4 may be implemented in the model application system 120 of FIG. 1. Each unit/component in the architecture 400 may be implemented by hardware, software, firmware, or any combination thereof.

As shown in FIG. 4, the source document 132 and the target abstract 134 may form a text sequence 402, which includes text elements of the source document 132 and the target abstract 134, and also includes a special symbol [CLS] indicating the start of the text sequence and a special symbol [SEP] for separating the document and the abstract. The source document 132 may be represented as $s=\{s_1, s_2, \ldots s_{Ls}\}$, where $s_n$ represents the $n^{th}$ text element (or token) in the source document 132, n=1, 2, . . . Ls, and Ls represents the number of text elements in the source document 132. The target abstract 134 may be represented as $t=\{t_1, t_2, \ldots t_{Lt}\}$, where $t_n$ represents the $n^{th}$ text element (or token) in the target abstract 134, n=1, 2, . . . Lt, and Lt represents the number of text elements in the target abstract 134.

The text sequence 402 is provided to the embedding layer 210, which converts the text sequence 402 into a corresponding embedding representation 412. The corresponding embedding representation 412 may be input into the consistency detection model 105. The consistency detection model 105 utilizes the trained parameter values to process the embedding representation 412 to obtain a target detection result 415, which indicates whether the target abstract 134 is consistent with the source document 132.

As mentioned above, the trained consistency detection model 105 may further provide error tracking capability. Specifically, the architecture 400 includes an error tracking unit 420, which provides error tracking functionality. If the target detection result 415 indicates that the target abstract 134 is inconsistent with the source document 132, then the error tracking unit 420 is activated. The error tracking unit 420 determines multiple change rates of the target detection result 415 relative to multiple target text elements in the target abstract 134. In some examples, the calculation of the change rates may include calculating the gradient of the target detection result 415 relative to multiple target text elements in the target abstract 134. The error tracking unit 420 may calculate the cross entropy loss, similar to the loss function $L_{ce}$, based on the embedding representation 412 corresponding to the text sequence 402, the current parameter values of the model (i.e. the trained parameter values) and the target detection result 415. Then, each gradient of the cross entropy loss relative to each target text element in the target abstract 134 is computed. The gradient distribution (i.e., the distribution of the change rates) of these text elements may indicate the extent to which each text element contributes to the inconsistency between the target abstract 134 and the source document 132.

In some embodiments, the error tracking unit 420 selects, based on the determined change rate (such as the extraction of each text element), text elements with a higher change rate from the target abstract 134, and determines the selected text element as an error text element in the target abstract 134. In some embodiments, the error tracking unit 420 may select the first k text elements with the highest change rates (k is an integer greater than or equal to 1) and label these text elements as incorrect. In some embodiments, the error tracking unit 420 may provide error prompting information 422 to indicate one or more text elements determined as errors in the target abstract 134.

The error prompting information 422 may be provided to a user, allowing the user to quickly understand which text elements in the target abstract 134 are incorrect, resulting in inconsistency between the target abstract 134 and the source document 132. In some embodiments, the inconsistent part may also be indicated to the user by various annotations (highlighting, underlining, dashed boxes, etc.) on the text elements in the target abstract 520.

Figure 5:
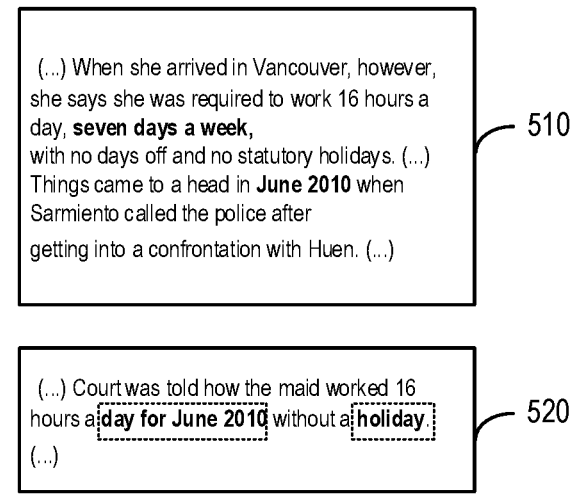
FIG. 5 illustrates an example of error tracking for an abstract according to some embodiments of the present disclosure.

FIG. 5 illustrates an example of error tracking of an abstract according to some embodiments of the present disclosure. In the example of FIG. 5, the source document 510 and the target abstract 520 are presented. In this example, text elements with a predetermined extraction change rate in the top 5 are labeled as inconsistent text elements. By determining the change rate of each text element in the target abstract 520, it may be determined that the words "day for June 2010" and "holiday" are incorrect generalized extractions, resulting in inconsistency with the facts described in the source document 510.

Example Process

Figure 6:
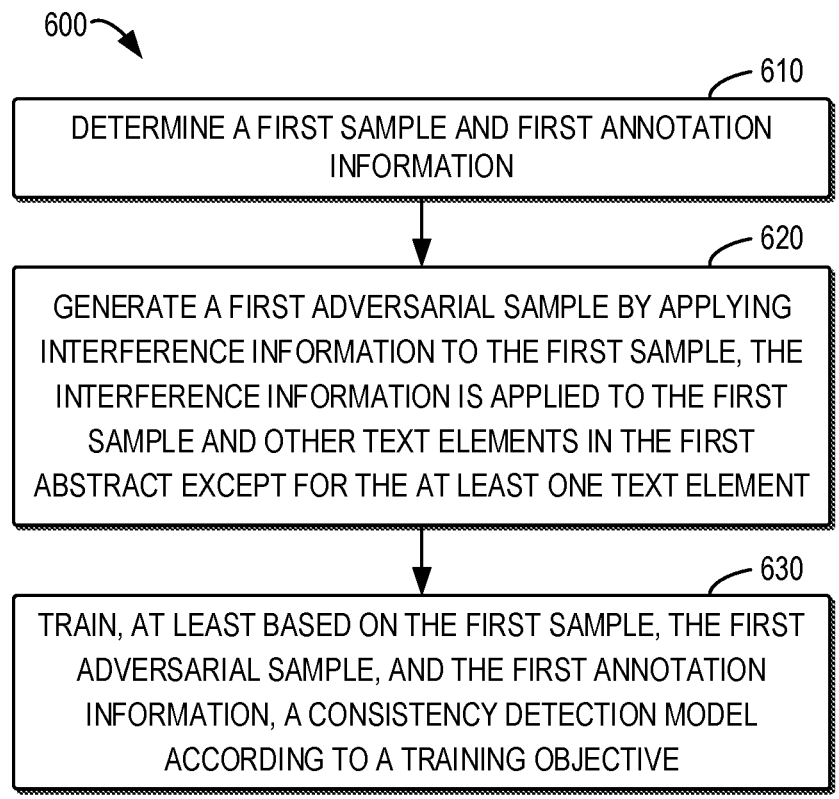
FIG. 6 illustrates a flowchart of a process for consistency detection between a document and an abstract according to some embodiments of the present disclosure.

FIG. 6 illustrates a flowchart of a process 600 for consistency detection of a document and an abstract according to some embodiments of the present disclosure. The process 600 may be implemented at the model training system 110 and/or the model application system 120.

At block 610, a first sample and first annotation information are determined. The first annotation information indicates that a first abstract and a first document included in the first sample are inconsistent, and at least one of a plurality of text elements in the first abstract is labeled as inconsistent with the first document.

In some embodiments, when determining the first sample, the first sample may be generated based on a sample in which the document and the abstract are consistent. Specifically, second annotation information and a second sample comprising the first document and a second abstract are obtained, and the second annotation information indicates that the second abstract is consistent with the first document. The first abstract is generated by modifying at least one text element in the second abstract. The first document and the first abstract are composed into the first sample. The first annotation information is generated to indicate that the first document is inconsistent with the first abstract. In some embodiments, the at least one modified text element included in the first abstract is labeled as inconsistent with the first document.

In some embodiments, when generating the first abstract, the entity in the second abstract may be replaced with a further entity of the same type in the first document. Alternatively, or in addition, in some embodiments, a pronoun in the second abstract is replaced with a further pronoun. Alternatively, or in addition, in some embodiments, a verb in an affirmative form in the second abstract is modified to a verb in a negative form, and/or a verb in a negative form in the second abstract is modified to a verb in an affirmative form.

At block 620, a first adversarial sample is generated by applying interference information to the first sample. The interference information is applied to the first sample and other text elements in the first abstract except for the at least one text element.

In some embodiments, the interference information to be applied is determined by: applying the first sample to the consistency detection model to obtain a first detection result output from the consistency detection model, the first detection result indicating whether the first document in the first sample is consistent with the first abstract; determining, based on a first difference between the first detection result and the first annotation information, total interference information for the first sample; and filtering out, from the total interference information, an information portion to be applied to the at least one text element labeled as inconsistent in the first abstract, to obtain the interference information. In this way, for the first sample including the inconsistent document and abstract, the interference information is not applied to an inconsistent text element.

At block 630, a consistency detection model is trained according to a training objective, at least based on the first sample, the first adversarial sample, and the first annotation information. The consistency detection model is configured to detect whether an abstract is consistent with a document. The training objective is configured to cause both a difference between the first annotation information and a detection result of the first sample from the consistency detection model, and a difference between the first annotation information and a detection result of the first adversarial sample from the consistency detection model to be within a predetermined threshold.

In some embodiments, training the consistency detection model comprises: applying the first sample and the first adversarial sample to the consistency detection model, respectively, to obtain a first detection result and a second detection result output from the consistency detection model, the first detection result indicating whether the first document and the first abstract in the first sample are consistent, the second detection result indicating whether the first document and a first interfered abstract are consistent; and updating parameter values of the consistency detection model based at least on a first difference between the first detection result and the first annotation information, and a second difference between the second detection result and the first annotation information.

In some embodiments, the consistency detection model is further trained using the sample with consistent text and abstract. Specifically, a third sample and third annotation information are determined. The third annotation information indicates that a third document and a third abstract included in the third sample are consistent. A third adversarial sample is generated by applying interference information to the third document and the third abstract. Further based on the third sample, the third adversarial sample, and the third annotation information, the consistency detection model is trained according to the training objective. The training objective is further configured to cause both a difference between the third annotation information and a detection result of the third sample from the consistency detection model, and a difference between the third annotation information and a detection result of the third adversarial sample from the consistency detection model to be within a predefined threshold.

The trained consistency detection model may be applied to detect the consistency between the document and the abstract. Specifically, in some embodiments, a source document and a target abstract are obtained. The source document and the target abstract are applied to the trained consistency detection model to obtain a target detection result output from the consistency detection model. The target detection result indicates whether the target abstract is consistent with the source document.

In some embodiments, the trained consistency detection model may further provide error tracking capability. Specifically, in accordance with a determination that the target detection result indicates that the target abstract is inconsistent with the source document, a plurality of change rates of the target detection result relative to a plurality of target text elements in the target abstract are determined. Based on the plurality of change rates, at least one target text element is selected from the plurality of target text elements. A change rate of the at least one target text element is greater than that of other text elements in the target abstract. In some embodiments, error prompting information may be provided to indicate that the at least one target text element in the target abstract is incorrect.

Example Apparatus and Device

Figure 7:
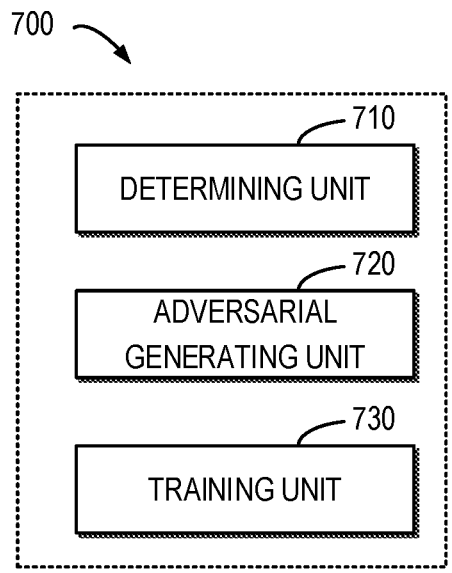
FIG. 7 illustrates a block diagram of an apparatus for consistency detection of a document and an abstract according to some embodiments of the present disclosure.

FIG. 7 illustrates a block diagram of an apparatus 700 for consistency detection of a document and an abstract according to some embodiments of the present disclosure. The apparatus 700 may be implemented or included in the model training system 110 and/or the model application system 120. Each unit/component in the apparatus 700 may be implemented by hardware, software, firmware, or any combination of them.

As shown in the figure, the apparatus 700 includes a determining unit 710 configured to a determining unit configured to determine a first sample and first annotation information. The first annotation information indicates that a first abstract and a first document included in the first sample are inconsistent. At least one of a plurality of text elements in the first abstract is labeled as inconsistent with the first document. The apparatus 700 further includes an adversarial generating unit 720 configured to generate a first adversarial sample by applying interference information to the first sample. The interference information is applied to the first sample and other text elements in the first abstract except for the at least one text element. The apparatus 700 further includes a training unit 730 configured to train, at least based on the first sample, the first adversarial sample, and the first annotation information, a consistency detection model according to a training objective. The consistency detection model is configured to detect whether an abstract is consistent with a document. The training objective is configured to cause both a difference between the first annotation information and a detection result of the first sample from the consistency detection model, and a difference between the first annotation information and a detection result of the first adversarial sample from the consistency detection model to be within a predetermined threshold.

In some embodiments, the determining unit 710 includes an obtaining unit configured to obtain second annotation information and a second sample comprising the first document and a second abstract. The second annotation information indicates that the second abstract is consistent with the first document. The determining unit 710 includes an abstract generating unit configured to generate the first abstract by modifying at least one text element in the second abstract. The determining unit 710 includes a sample composing unit configured to compose the first document and the first abstract into the first sample. The determining unit 710 includes an annotation generating unit configured to generate the first annotation information to indicate that the first document is inconsistent with the first abstract.

In some embodiments, the at least one modified text element included in the first abstract is labeled as inconsistent with the first document.

In some embodiments, the abstract generating unit is configured to modify at least one text element in the second abstract through at least one of the following: replacing an entity in the second abstract with a further entity of a same type in the first document, replacing a pronoun in the second abstract with a further pronoun, modifying a verb in an affirmative form in the second abstract to a verb in a negative form, or modifying a verb in a negative form in the second abstract to a verb in an affirmative form.

In some embodiments, the apparatus 700 further includes an interference determining unit configured to determine the interference information to be applied by: applying the first sample to the consistency detection model to obtain a first detection result output from the consistency detection model. The first detection result indicates whether the first document in the first sample is consistent with the first abstract. The interference determining unit is further configured to determine, based on a first difference between the first detection result and the first annotation information, total interference information for the first sample; and filter out, from the total interference information, an information portion to be applied to the at least one text element labeled as inconsistent in the first abstract, to obtain the interference information.

In some embodiments, the model training unit 730 includes a sample application unit configured to apply the first sample and the first adversarial sample to the consistency detection model, respectively, to obtain a first detection result and a second detection result output from the consistency detection model. The first detection result indicates whether the first document and the first abstract in the first sample are consistent, and the second detection result indicates whether the first document and a first interfered abstract are consistent. The sample application unit is further configured to update parameter values of the consistency detection model based at least on a first difference between the first detection result and the first annotation information, and a second difference between the second detection result and the first annotation information.

In some embodiments, the model training unit 730 further includes a sample determining unit configured to determine a third sample and third annotation information. The third annotation information indicates that a third document and a third abstract included in the third sample are consistent. The model training unit 730 further includes a further adversarial sample generating unit configured to generate a third adversarial sample by applying interference information to the third document and the third abstract. The model training unit 730 further includes a further model training unit configured to train, further based on the third sample, the third adversarial sample, and the third annotation information, the consistency detection model according to the training objective. The training objective is further configured to cause both a difference between the third annotation information and a detection result of the third sample from the consistency detection model, and a difference between the third annotation information and a detection result of the third adversarial sample from the consistency detection model to be within a predefined threshold.

In some embodiments, the apparatus 700 further includes a document and abstract obtaining unit configured to obtain a source document and a target abstract; and a model application unit configured to apply the source document and the target abstract to the trained consistency detection model to obtain a target detection result output from the consistency detection model. The target detection result indicates whether the target abstract is consistent with the source document.

In some embodiments, the apparatus 700 further includes a change rate determining unit configured to in accordance with a determination that the target detection result indicates that the target abstract is inconsistent with the source document, determine a plurality of change rates of the target detection result relative to a plurality of target text elements in the target abstract. The apparatus 700 further includes a text element selecting unit configured to select, based on the plurality of change rates, at least one target text element from the plurality of target text elements. The change rate of the at least one target text element is greater than that of other text elements in the target abstract. The apparatus 700 further includes an error prompting unit configured to provide error prompting information to indicate that the at least one target text element in the target abstract is incorrect.

Figure 8:
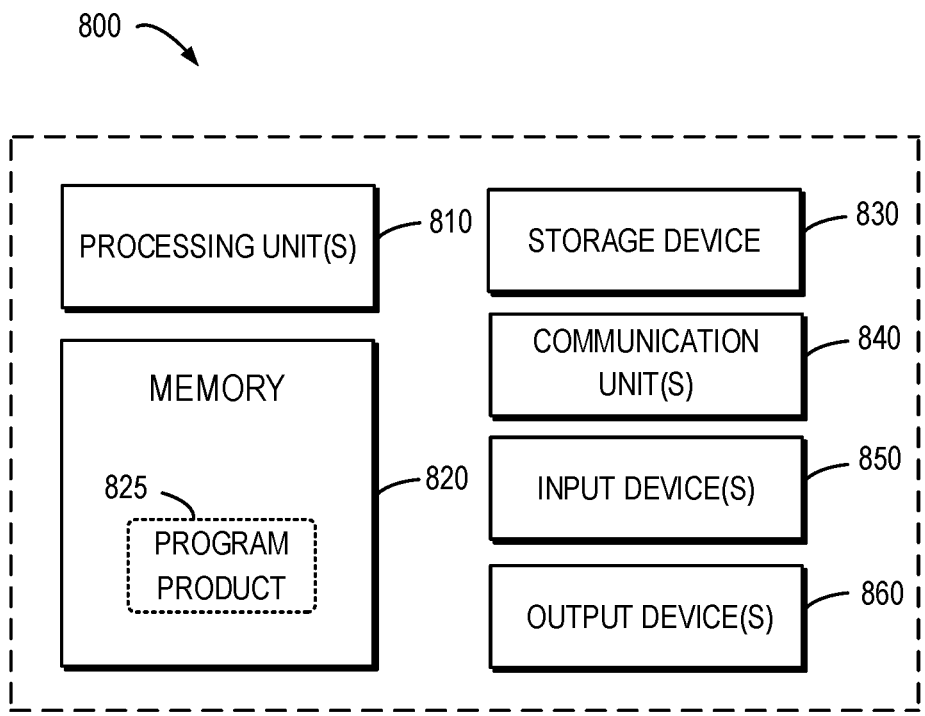
FIG. 8 illustrates a block diagram of a device capable of implementing various embodiments of the present disclosure.

FIG. 8 illustrates a block diagram of a computing device/server 800 in which one or more embodiments of the present disclosure may be implemented. It should be understood that the computing device/server 800 shown in FIG. 8 is only an example and should not constitute any limitation on the functionality and scope of the embodiments described herein.

As shown in FIG. 8, the computing device/server 800 is in the form of a general computing device. The components of computing device/server 800 may include, but are not limited to, one or more processors or processing units 810, a memory 820, a storage device 830, one or more communication units 840, one or more input devices 850, and one or more output devices 860. The processing unit 810 may be an actual or virtual processor and can execute various processes based on the programs stored in the memory 820. In a multiprocessor system, multiple processing units execute computer executable instructions in parallel to improve the parallel processing capability of the computing device/server 800.

The computing device/server 800 typically includes multiple computer storage medium. Such medium may be any available medium that is accessible to the computing device/server 800, including but not limited to volatile and non-volatile medium, removable and non-removable medium. The memory 820 may be volatile memory (for example, a register, cache, a random access memory (RAM)), a non-volatile memory (for example, a read-only memory (ROM), an electrically erasable programmable read-only memory (EEPROM), a flash memory), or any combination thereof. The storage device 830 may be any removable or non-removable medium, and may include a machine readable medium such as a flash drive, a disk, or any other medium, which may be used to store information and/or data (such as training data for training) and may be accessed within the computing device/server 800.

The computing device/system 800 may further include additional removable/non-removable, volatile/non-volatile storage medium. Although not shown in FIG. 8, a disk driver for reading from or writing to a removable, non-volatile disk (such as a "floppy disk"), and an optical disk driver for reading from or writing to a removable, non-volatile optical disk may be provided. In these cases, each driver may be connected to the bus (not shown) by one or more data medium interfaces. The memory 820 may include a computer program product 825, which has one or more program units configured to perform various methods or acts of various embodiments of the present disclosure.

The communication unit 840 communicates with a further computing device through the communication medium. In addition, functions of components in the computing device/system 800 may be implemented by a single computing cluster or multiple computing machines, which can communicate through a communication connection. Therefore, the computing device/system 800 may be operated in a networking environment using a logical connection with one or more other servers, a network personal computer (PC), or another network node.

The input device 850 may be one or more input devices, such as a mouse, a keyboard, a trackball, etc. The output device 860 may be one or more output devices, such as a display, a speaker, a printer, etc. The computing device/system 800 may also communicate with one or more external devices (not shown) through the communication unit 840 as required. The external device, such as a storage device, a display device, etc., communicate with one or more devices that enable users to interact with the computing device/system 800, or communicate with any device (for example, a network card, a modem, etc.) that makes the computing device/system 800 communicate with one or more other computing devices. Such communication may be executed via an input/output (I/O) interface (not shown).

According to example implementation of the present disclosure, a computer-readable storage medium is provided, on which a computer-executable instruction or computer program is stored, wherein the computer-executable instructions is executed by the processor to implement the method described above. According to example implementation of the present disclosure, a computer program product is also provided. The computer program product is physically stored on a non-transient computer-readable medium and includes computer-executable instructions, which are executed by the processor to implement the method described above.

Various aspects of the present disclosure are described herein with reference to the flow chart and/or the block diagram of the method, the apparatus, the device and the computer program product implemented in accordance with the present disclosure. It would be appreciated that each block of the flowchart and/or the block diagram and the combination of each block in the flowchart and/or the block diagram may be implemented by computer-readable program instructions.

These computer-readable program instructions may be provided to the processing units of general-purpose computers, specialized computers or other programmable data processing devices to produce a machine that generates an apparatus to implement the functions/actions specified in one or more blocks in the flow chart and/or the block diagram when these instructions are executed through the computer or other programmable data processing apparatuses. These computer-readable program instructions may also be stored in a computer-readable storage medium. These instructions enable a computer, a programmable data processing apparatus and/or other devices to work in a specific way. Therefore, the computer-readable medium containing the instructions includes a product, which includes instructions to implement various aspects of the functions/actions specified in one or more blocks in the flowchart and/or the block diagram.

The computer-readable program instructions may be loaded onto a computer, other programmable data processing apparatus, or other devices, so that a series of operational steps may be performed on a computer, other programmable data processing apparatus, or other devices, to generate a computer-implemented process, such that the instructions which execute on a computer, other programmable data processing apparatuses, or other devices implement the functions/acts specified in one or more blocks in the flowchart and/or the block diagram.

The flowchart and the block diagram in the drawings show the possible architecture, functions and operations of the system, the method and the computer program product implemented in accordance with the present disclosure. In this regard, each block in the flowchart or the block diagram may represent a part of a unit, a program segment or instructions, which contains one or more executable instructions for implementing the specified logic function. In some alternative implementations, the functions labeled in the block may also occur in a different order from those labeled in the drawings. For example, two consecutive blocks may actually be executed in parallel, and sometimes can also be executed in a reverse order, depending on the function involved. It should also be noted that each block in the block diagram and/or the flowchart, and combinations of blocks in the block diagram and/or the flowchart, may be implemented by a dedicated hardware-based system that performs the specified functions or acts, or by the combination of dedicated hardware and computer instructions.

Each implementation of the present disclosure has been described above. The above description is an example, not exhaustive, and is not limited to the disclosed implementations. Without departing from the scope and spirit of the described implementations, many modifications and changes are obvious to ordinary skill in the art. The selection of terms used in the present disclosure aims to best explain the principles, practical application or improvement of technology in the market of each implementation, or to enable other ordinary skill in the art to understand the various embodiments disclosed herein.

What is claimed is:

1. A computer-implemented method of consistency detection of a document and an abstract, comprising:
    determining, by a computing device, a first sample and first annotation information, the first annotation information indicating that a first abstract and a first document included in the first sample are inconsistent, at least one of a plurality of text elements in the first abstract being labeled as inconsistent with the first document;
    generating, by the computing device, a first adversarial sample by applying interference information to the first sample, the interference information being applied to the first sample and other text elements in the first abstract except for the at least one text element;
    training, by the computing device, at least based on the first sample, the first adversarial sample, and the first annotation information, a consistency detection model according to a training objective, the consistency detection model being configured to detect whether an abstract is consistent with a document by processing textual data through a neural network, the training objective being configured to cause both a difference between the first annotation information and a detection result of the first sample from the consistency detection model, and a difference between the first annotation information and a detection result of the first adversarial sample from the consistency detection model to be within a predetermined threshold; and
    applying, by the computing device, a source document and a target abstract to the trained consistency detection model to obtain a target detection result output from the trained consistency detection model, the target detection result indicating whether the target abstract is consistent with the source document.

2. The method according to claim 1, wherein determining the first sample and the first annotation information comprises:
    obtaining second annotation information and a second sample comprising the first document and a second abstract, the second annotation information indicating that the second abstract is consistent with the first document;
    generating the first abstract by modifying at least one text element in the second abstract;
    composing the first document and the first abstract into the first sample; and
    generating the first annotation information to indicate that the first document is inconsistent with the first abstract.

3. The method according to claim 2, wherein the at least one modified text element included in the first abstract is labeled as inconsistent with the first document.

4. The method according to claim 2, wherein generating the first abstract comprises:
    modifying at least one text element in the second abstract through at least one of the following:
        replacing an entity in the second abstract with a further entity of a same type in the first document,
        replacing a pronoun in the second abstract with a further pronoun,
        modifying a verb in an affirmative form in the second abstract to a verb in a negative form, or
        modifying a verb in a negative form in the second abstract to a verb in an affirmative form.

5. The method according to claim 1, further comprising: determining the interference information to be applied by:
    applying the first sample to the consistency detection model to obtain a first detection result output from the consistency detection model, the first detection result indicating whether the first document in the first sample is consistent with the first abstract;
    determining, based on a first difference between the first detection result and the first annotation information, total interference information for the first sample; and
    filtering out, from the total interference information, an information portion to be applied to the at least one text element labeled as inconsistent in the first abstract, to obtain the interference information.

6. The method according to claim 1, wherein training the consistency detection model comprises:
    applying the first sample and the first adversarial sample to the consistency detection model, respectively, to obtain a first detection result and a second detection result output from the consistency detection model, the first detection result indicating whether the first document and the first abstract in the first sample are consistent, the second detection result indicating whether the first document and the first abstract with the interference information applied are consistent; and
    updating parameter values of the consistency detection model based at least on a first difference between the first detection result and the first annotation information, and a second difference between the second detection result and the first annotation information.

7. The method according to claim 1, wherein training the consistency detection model comprises:
    determining a third sample and third annotation information, the third annotation information indicating that a third document and a third abstract included in the third sample are consistent;
    generating a third adversarial sample by applying interference information to the third document and the third abstract; and
    training, further based on the third sample, the third adversarial sample, and the third annotation information, the consistency detection model according to the training objective, the training objective being further configured to cause both a difference between the third annotation information and a detection result of the third sample from the consistency detection model, and a difference between the third annotation information and a detection result of the third adversarial sample from the consistency detection model to be within a predefined threshold.

8. The method according to claim 1, further comprising: obtaining the source document and the target abstract.

9. The method according to claim 8, further comprising:
in accordance with a determination that the target detection result indicates that the target abstract is inconsistent with the source document, determining a plurality of change rates of the target detection result relative to a plurality of target text elements in the target abstract;
selecting, based on the plurality of change rates, at least one target text element from the plurality of target text elements, a change rate of the at least one target text element being greater than that of other text elements in the target abstract; and
providing error prompting information to indicate that the at least one target text element in the target abstract is incorrect.

10. An electronic device, comprising:
at least one processing unit; and
at least one memory coupled to the at least one processing unit and storing instructions executable by the at least one processing unit, the instructions, when executed by the at least one processing unit, causing the device to perform the following actions:
determining a first sample and first annotation information, the first annotation information indicating that a first abstract and a first document included in the first sample are inconsistent, at least one of a plurality of text elements in the first abstract being labeled as inconsistent with the first document;
generating a first adversarial sample by applying interference information to the first sample, the interference information being applied to the first sample and other text elements in the first abstract except for the at least one text element;
training, at least based on the first sample, the first adversarial sample, and the first annotation information, a consistency detection model according to a training objective, the consistency detection model being configured to detect whether an abstract is consistent with a document by processing textual data through a neural network, the training objective being configured to cause both a difference between the first annotation information and a detection result of the first sample from the consistency detection model, and a difference between the first annotation information and a detection result of the first adversarial sample from the consistency detection model to be within a predetermined threshold; and
applying a source document and a target abstract to the trained consistency detection model to obtain a target detection result output from the trained consistency detection model, the target detection result indicating whether the target abstract is consistent with the source document.

11. The device according to claim 10, wherein determining the first sample and the first annotation information comprises:
obtaining second annotation information and a second sample comprising the first document and a second abstract, the second annotation information indicating that the second abstract is consistent with the first document;
generating the first abstract by modifying at least one text element in the second abstract;
composing the first document and the first abstract into the first sample; and
generating the first annotation information to indicate that the first document is inconsistent with the first abstract.

12. The device according to claim 11, wherein the at least one modified text element included in the first abstract is labeled as inconsistent with the first document.

13. The device according to claim 11, wherein generating the first abstract comprises:
modifying at least one text element in the second abstract through at least one of the following:
replacing an entity in the second abstract with a further entity of a same type in the first document,
replacing a pronoun in the second abstract with a further pronoun,
modifying a verb in an affirmative form in the second abstract to a verb in a negative form, or
modifying a verb in a negative form in the second abstract to a verb in an affirmative form.

14. The device according to claim 10, the actions further comprising: determining the interference information to be applied by:
applying the first sample to the consistency detection model to obtain a first detection result output from the consistency detection model, the first detection result indicating whether the first document in the first sample is consistent with the first abstract;
determining, based on a first difference between the first detection result and the first annotation information, total interference information for the first sample; and
filtering out, from the total interference information, an information portion to be applied to the at least one text element labeled as inconsistent in the first abstract, to obtain the interference information.

15. The device according to claim 10, wherein training the consistency detection model comprises:
applying the first sample and the first adversarial sample to the consistency detection model, respectively, to obtain a first detection result and a second detection result output from the consistency detection model, the first detection result indicating whether the first document and the first abstract in the first sample are consistent, the second detection result indicating whether the first document and the first abstract with the interference information applied are consistent; and
updating parameter values of the consistency detection model based at least on a first difference between the first detection result and the first annotation information, and a second difference between the second detection result and the first annotation information.

16. The device according to claim 10, wherein training the consistency detection model comprises:
determining a third sample and third annotation information, the third annotation information indicating that a third document and a third abstract included in the third sample are consistent;
generating a third adversarial sample by applying interference information to the third document and the third abstract; and training, further based on the third sample, the third adversarial sample, and the third annotation information, the consistency detection model according to the training objective, the training objective being further configured to cause both a difference between the third annotation information and a detection result of the third sample from the consistency detection model, and a difference between the third annotation information and a detection result of the third adversarial sample from the consistency detection model to be within a predefined threshold.

17. The device according to claim 10, wherein the actions further comprises:
   obtaining the source document and the target abstract.

18. The device according to claim 17, wherein the actions further comprises:
   in accordance with a determination that the target detection result indicates that the target abstract is inconsistent with the source document, determining a plurality of change rates of the target detection result relative to a plurality of target text elements in the target abstract;
   selecting, based on the plurality of change rates, at least one target text element from the plurality of target text elements, a change rate of the at least one target text element being greater than that of other text elements in the target abstract; and
   providing error prompting information to indicate that the at least one target text element in the target abstract is incorrect.

19. A non-transitory computer-readable storage medium having a computer program stored thereon which, when executed by a processor, performs the method of consistency detection of a document and an abstract, the method comprising:
   determining a first sample and first annotation information, the first annotation information indicating that a first abstract and a first document included in the first sample are inconsistent, at least one of a plurality of text elements in the first abstract being labeled as inconsistent with the first document;
   generating a first adversarial sample by applying interference information to the first sample, the interference information being applied to the first sample and other text elements in the first abstract except for the at least one text element;
   training, at least based on the first sample, the first adversarial sample, and the first annotation information, a consistency detection model according to a training objective, the consistency detection model being configured to detect whether an abstract is consistent with a document by processing textual data through a neural network, the training objective being configured to cause both a difference between the first annotation information and a detection result of the first sample from the consistency detection model, and a difference between the first annotation information and a detection result of the first adversarial sample from the consistency detection model to be within a predetermined threshold; and
   applying a source document and a target abstract to the trained consistency detection model to obtain a target detection result output from the trained consistency detection model, the target detection result indicating whether the target abstract is consistent with the source document.

20. The non-transitory computer-readable storage medium according to claim 19, wherein determining the first sample and the first annotation information comprises:
   obtaining second annotation information and a second sample comprising the first document and a second abstract, the second annotation information indicating that the second abstract is consistent with the first document;
   generating the first abstract by modifying at least one text element in the second abstract;
   composing the first document and the first abstract into the first sample; and
   generating the first annotation information to indicate that the first document is inconsistent with the first abstract.

* * * * *